United States Patent
Lo et al.

[11] Patent Number: 6,019,557
[45] Date of Patent: *Feb. 1, 2000

[54] METHOD FOR FORMING A FASTENER AND A FASTENER OBTAINED THEREBY

[75] Inventors: Tsan-Chung Lo, Tu-Chen; Tai Lin, Shu-Lin Chen; Thomas R. L. Tsai, Tu-Chen, all of Taiwan

[73] Assignee: Hon Hai Precision Ind. Co., Ltd., Taipei Hsien, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 09/197,087

[22] Filed: Nov. 19, 1998

[30] Foreign Application Priority Data

Nov. 19, 1997 [TW] Taiwan ................................. 86117414

[51] Int. Cl.$^7$ ............................. F16B 37/04; F16B 37/08
[52] U.S. Cl. ......................... 411/176; 411/180; 411/432; 470/25
[58] Field of Search ..................................... 411/176, 178, 411/180, 181, 84, 85, 432, 437; 470/25

[56] References Cited

U.S. PATENT DOCUMENTS

| | | | |
|---|---|---|---|
| Re. 17,907 | 12/1930 | Andren | 411/181 X |
| 1,883,906 | 10/1932 | Hasselquist | 411/178 X |
| 2,784,930 | 3/1957 | Wenecke | 411/176 X |
| 3,339,953 | 9/1967 | Bohn | 411/84 X |
| 3,497,890 | 3/1970 | Coyle | 411/437 X |
| 5,080,546 | 1/1992 | Purvin et al. | 411/432 X |

*Primary Examiner*—Neill Wilson

[57] ABSTRACT

A process for forming a fastener for use in a D-Sub electrical connector to enable the connector to fixedly connect with a mated connector by threadedly engaging a bolt with the fastener, comprising the following steps:

stamping a first metallic plate to have a first face with a number of parallel V-cuts therein, a second opposite face with an elongate flange, and a number of keys above the flange;

bending the first metallic plate to obtain a sleeve with the V-cuts forming an internal thread in the sleeve, a circular flange at a lower edge of a peripheral perimeter of the sleeve, and a number of keys above the circular flange;

stamping a second metallic plate to form a base having a first hole, a circular protrusion projecting into the hole, and a number keyways in the protrusion; and assembling the sleeve to the base by extending the sleeve through the hole to reach a position in which the sleeve has an interferential engagement with the protrusion, the keys are fittingly received in the keyways, and the circular flange is received in the first hole by an interferential fit.

13 Claims, 4 Drawing Sheets

6,019,557

METHOD FOR FORMING A FASTENER AND A FASTENER OBTAINED THEREBY

BACKGROUND OF THE INVENTION

1. Field of the Invention

The present invention relates to a method for forming a fastener which fastens a D-Sub electrical connector to a mated D-Sub electrical connector by threadedly engaging with a mated bolt, and a fastener obtained by such a method.

2. The Prior Art

Referring to FIGS. 1 and 2, a conventional fastener 8 for connecting two D-Sub connectors together by threadedly engaging with a mated bolt has a rectangular base 80 and a sleeve 81 projecting from a middle portion of the base 80. The sleeve 81 defines a flat distal edge 810 which is subject to a riveting operation and an internal thread 811 below the distal edge 810. A D-Sub connector 9 has a dielectric housing 90 formed with a front face 92 for engaging with a mated connector (not shown) and a flange 94, a metallic shielding 95 fixedly attached to a front face of the flange 94, a board lock 96 fixedly attached to a rear face of the flange 94 and having a leg 962 extending through a horizontal portion of the flange 94 for fixing the connector 9 to a printed circuit board (not shown), and a hole 942 defined through the board lock 96, a vertical portion of the flange 94 and the shielding 95. To mount the fastener 8 to the connector 9, the sleeve 81 of the fastener 8 is extended into the hole 942 to reach a position where the base 80 engages with the board lock 96 and the distal edge 810 of the sleeve 81 projects beyond the shielding 95. Then, a riveting operation is conducted on the distal edge 810 to deform and fixedly engage the fastener 8 with the shielding 95 whereby the fastener 8 is secured to the connector 9. When the connector 9 is connected with a mated connector (not shown), a bolt in the mated connector can extend into the sleeve 81 to threadedly engage with the thread 811 thereby securely engaging the two connectors.

FIG. 3 diagrammatically shows the process for forming the conventional fastener 8 which mainly consists of four steps: (a) primary machining which lathes a metal block to have a shape generally like the fastener 8 but with the sleeve 81 being solid, (b) boring which forms the sleeve by a boring operation, (c) tapping which forms the thread 811 by a tapping tool, and (d) finish machining which provides the accurate size and shape of the fastener 8. Such a process is laborious and produces a lot of waste material resulting in a high manufacturing cost.

Hence, an improved method to produce a fastener is needed to eliminate the above mentioned defects of the current art.

SUMMARY OF THE INVENTION

Accordingly, an objective of the present invention is to provide a process for forming a fastener particularly used in an electrical connector, and more particularly in a D-Sub connector, which is relatively simple and will not produce waste material.

Another objective of the present invention is to provide a fastener obtained by the process.

To fulfill the above mentioned objectives, according to one embodiment of the present invention, a process for forming a fastener for use in a D-Sub electrical connector comprises the following steps:

(a) stamping a first rectangular metallic plate to have a first face defining a number of parallel V-cuts therein and an upper flat edge, a second opposite face with a flange at a lower edge thereof, a number of locating keys just above the flange, and two lateral sides between the first and second faces;

(b) bending the first metallic plate to have a sleeve configuration with the two lateral sides contacting each other, the first face located inside of the sleeve to have the V-cuts define a thread in the sleeve and a flat edge above the thread, and the second face outside the sleeve to have a circular flange at a lower edge thereof and locating keys above the flange;

(c) stamping a second rectangular metallic plate to obtain a base which has a first hole in a middle thereof with a diameter slightly smaller than that defined by a peripheral perimeter of the circular flange, a circular protrusion projecting into the first hole to define a second hole with a diameter slightly smaller than that of the sleeve and a number of keyways defined in the protrusion; and (d) assembling the sleeve to the base by extending the sleeve through the first and second holes to reach a position where the sleeve has an interferential engagement with the circular protrusion, the keys are fittingly received within the corresponding keyways, the flange is received within the first hole by an interferential fit, and a bottom face of the sleeve is flush with a bottom face of the base which is distant from the protrusion.

DETAILED DESCRIPTION OF THE PREFERRED EMBODIMENT

Reference will now be made in detail to the preferred embodiment of the present invention.

Figure 1:
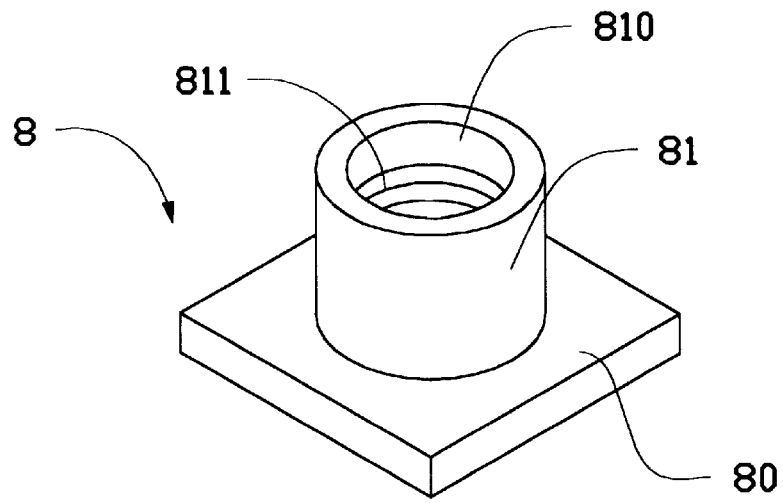
FIG. 1 is a perspective view of a prior art fastener for fastening two D-Sub connectors together by threadedly engaging with a bolt.
Figure 2:
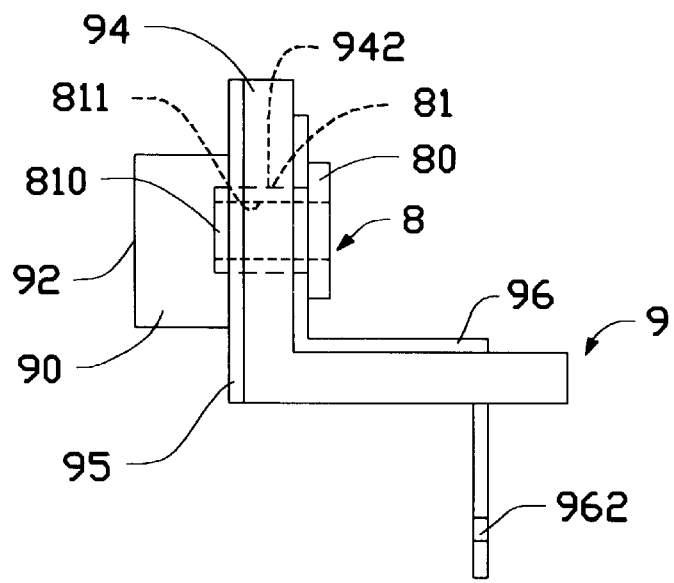
FIG. 2 is a side view showing the mounting of the fastener of FIG. 1 in a D-Sub electrical connector.
Figure 3:
FIG. 3 is a flow chart describing the process for forming the fastener of FIG. 1.
Figure 4:
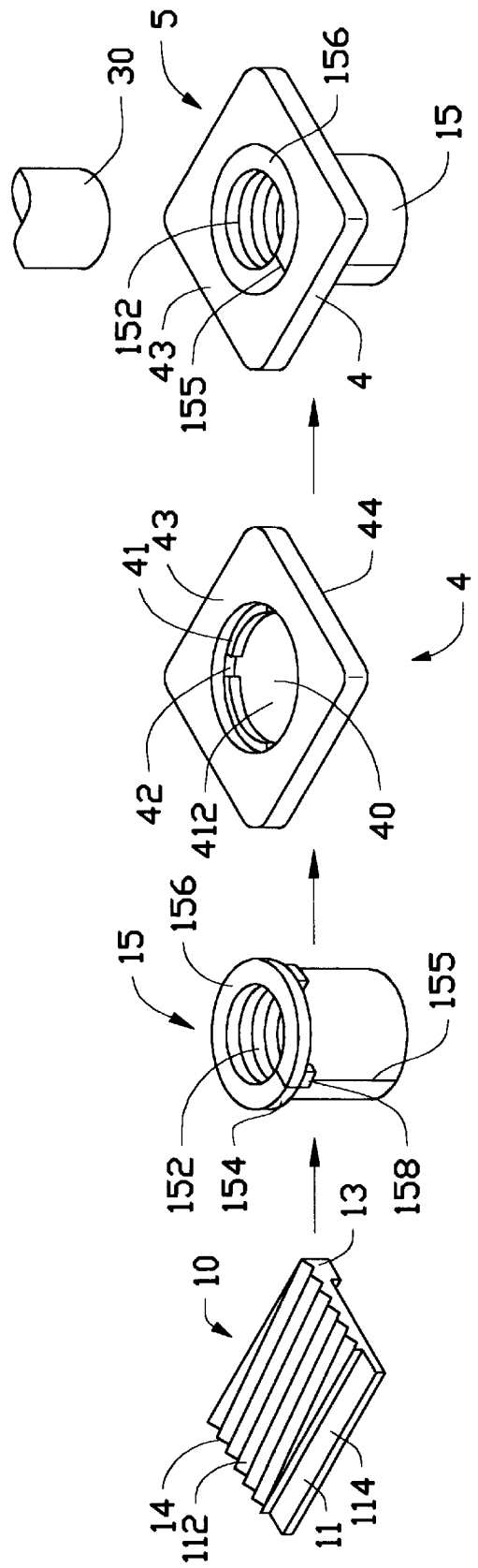
FIG. 4 is a perspective view showing the steps for forming a fastener in accordance with the present invention.
Figure 5:
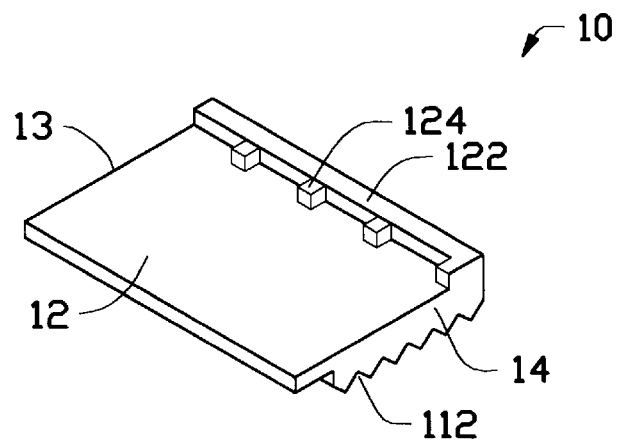
FIG. 5 is a perspective view of showing another side of a stamped plate for forming a threaded sleeve of the fastener of FIG. 4.
Figure 6:
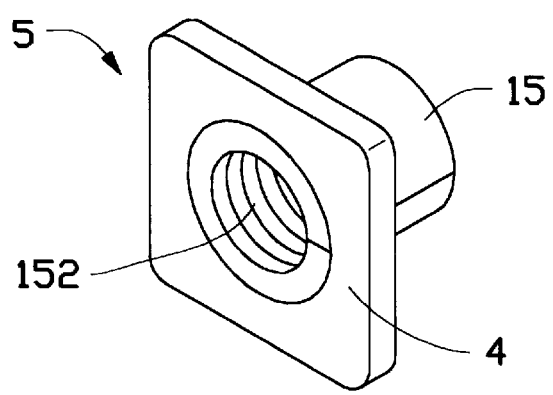
FIG. 6 is a perspective view of the finished fastener in accordance with the present invention.
Figure 7:
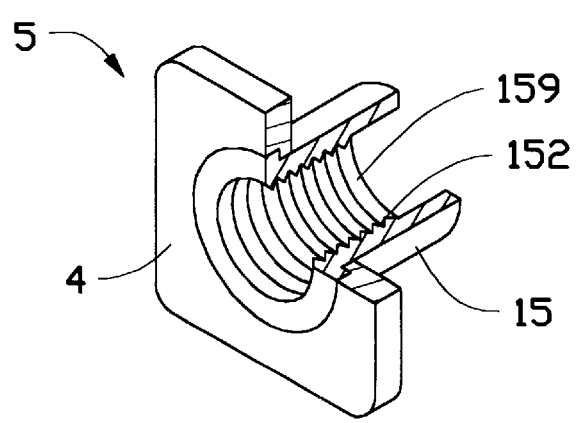
FIG. 7 is a partial cross-sectional view of the fastener of FIG. 6.

Referring to FIGS. 4 to 7, to form a fastener 5 in accordance with the present invention, firstly, a substantially rectangular first plate 10 is stamped to have a first face 11 with a number of parallel, slanted V-cuts 112 formed thereon and a flat area 114 adjacent to a top edge thereof, a second opposite face 12 forming an elongate flange 122 (FIG. 5) at a bottom edge thereof and four equally-spaced keys 124 just above the flange 122, and two lateral sides 13, 14 between the first and second faces 11, 12.

The first plate 10 is subject to a bending operation to become a sleeve 15 with the two lateral sides 13, 14 in contact with each other and defining a longitudinal slit 155 along the sleeve 15, the first face 11 forming an inner face of the sleeve 15 and the second face 12 forming an outer face of the sleeve 15. Thus, the sleeve 15 has an internal thread 152 therein formed by the V-cuts 112, a circular flange 154 at a bottom edge thereof formed by the elongate flange 122, and four equidistant locating keys 158 just above the circular flange 154 formed by the keys 124. To increase the rigidity of the sleeve 15, a spot soldering can be applied to the sleeve 15 at the slit 155 thereby fixedly connecting the two lateral sides 13, 14 together. The circular flange 154 has a bottom face 156 distant from a flat upper edge 159 (FIG. 7) of the sleeve 15 formed by the flat area 114 of the first plate 10.

Thereafter, a base 4 is formed by stamping a substantially rectangular second plate to have a first hole 40 of a diameter slightly smaller than that of a peripheral perimeter of the circular flange 154. A circular protrusion 41 projects into the first hole 40 and defines a second hole 412 of a diameter slightly smaller than that of the sleeve 15. Four equidistant locating keyways 42 are defined in the protrusion 41. The first hole 40 is defined between a bottom face 43 and a top face 44 of the base 4 wherein the protrusion 41 is located near the top face 44.

The sleeve 15 is assembled to the base 4 to obtain the fastener 5 by extending the sleeve 15 through the first and second holes 40, 412 to reach a position where the sleeve 15 has an interferential engagement with the protrusion 41, the locating keys 158 are fittingly received within the corresponding keyways 42, the circular flange 154 is received within the first hole 40 by an interferential fit and sits against the protrusion 41, and the bottom face 156 of the circular flange 154 is flush with the bottom face 43 of the base 4.

Finally, a tapping tool 30 is drivably extended into the sleeve 15 to finish the thread 152 thereby giving it a more accurate shape and dimension so that it can engage precisely with a mated bolt.

Alternatively, the tapping work can be performed immediately after the sleeve 15 has been formed.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A method for forming a fastener for use in an electrical connector to enable the connector to fixedly connect with a mated connector by a bolt of the mated connector threadedly engaging with the fastener, comprising the following steps:

(a) stamping a first rectangular metal plate to have a first face defining a number of parallel V-cuts thereon, an opposite second face with an elongate flange on a lower edge thereof, and two lateral sides between the first and second faces;

(b) bending the first plate to obtain a sleeve with the V-cuts forming a thread in the sleeve, the two lateral sides contacting each other, and the elongate flange forming a circular flange;

(c) stamping a second rectangular plate to obtain a base defining a first hole between a top and a bottom face of the base of a diameter slightly smaller than that of the circular flange, a circular protrusion projecting into the first hole to define a second hole having a diameter slightly smaller than that of the sleeve, the protrusion being located near the top face; and (d) assembling the sleeve to the base by extending the sleeve through the first and second holes of the base to reach a position where the sleeve has an interferential engagement with the protrusion and the flange is received within the first hole by an interferential fit.

2. The method in accordance with claim 1 further comprising the following step after step (d):
   tapping the thread in the sleeve whereby the thread can have a more accurate shape and dimension.

3. The method in accordance with claim 1 further comprising the following step after step (b):
   tapping the thread in the sleeve whereby the thread can have a more accurate shape and dimension.

4. The method in accordance with claim 1 further comprising the following step after step (b):
   soldering the connected lateral sides together to fixedly connect them with each other.

5. The method in accordance with claim 1 wherein in step (a) a flat area is formed on the first face of the first plate above the V-cuts so that when the sleeve is formed by step (b) a flat upper edge is defined in the sleeve above the thread.

6. The method in accordance with claim 1 wherein in step (a) a number of keys are formed on the second face above the elongate flange so that when the sleeve is formed by step (b) a number of locating keys are formed above the circular flange, in step (c) a number of locating keyways are defined in the protrusion, and in step (d) the locating keys are fittingly received in the corresponding keyways.

7. The method in accordance with claim 1, wherein in step (d) the circular flange of the sleeve rests on the protrusion of the base.

8. The method in accordance with claim 1, wherein in step (d) a bottom face of the circular flange of the sleeve is flush with the bottom face of the base.

9. A fastener for use in an electrical connector to enable the connector to fixedly connect with a mating connector by a bolt of the mating connector threadedly engaging with the fastener, comprising:

A rectangular base plate defining a first face, an opposite second face, a first hole between the first and second faces, a circular protrusion located near the second face and projecting into the first hole to define a second hole; and a sleeve formed by bending a rectangular metal plate to have two lateral sides thereof contacting each other and defining a slit therebetween, the sleeve defining an internal thread and extending through the second hole to has an interferential engagement with the protrusion and having a lower circular flange received in the first hole by an interferential fit and resting on the protrusion.

10. The fastener in accordance with claim 9, wherein the protrusion defines a number of keyways therein and the sleeve has a number of keys above the flange, the keys being fittingly received in the corresponding keyways.

11. The fastener in accordance with claim 9, wherein the sleeve defines a flat inner edge distant from the base.

12. The fastener in accordance with claim 9, wherein solder is applied to the slit.

13. The fastener in accordance with claim 9, wherein the flange has a bottom face flush with the first face of the base.

* * * * *